G. A. KEENE.
Prop-Nut and Rivet for Carriages.
No. 161,518.　　　　　　　　　　Patented March 30, 1875.
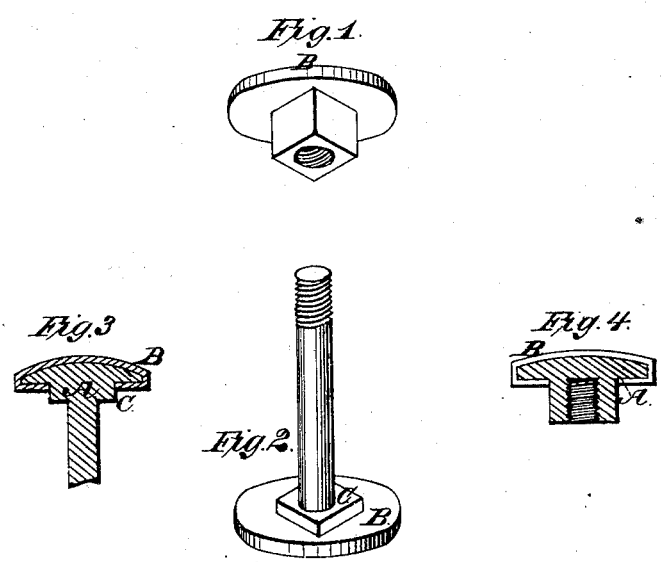

UNITED STATES PATENT OFFICE.

GEORGE A. KEENE, OF LYNN, MASSACHUSETTS.

IMPROVEMENT IN PROP NUTS AND RIVETS FOR CARRIAGES.

Specification forming part of Letters Patent No. 161,518, dated March 30, 1875; application filed July 25, 1874.

*To all whom it may concern:*

Be it known that I, GEORGE A. KEENE, of the city of Lynn, Massachusetts, have invented an Improvement in Prop Nuts and Rivets for Carriages, &c., of which the following is a specification:

My invention consists in covering the head of a prop nut or rivet with soft rubber by the vulcanizing process. The nut is made with a rough unfinished head, which forms the core around which the rubber is vulcanized by heat. The head of the rivet is also unfinished, and both the rivet and the nut on the under side, surrounding the stem, are provided with a shoulder, against which the rubber abuts, preventing wear of the rubber by contact with the parts riveted. The core is notched on the edge to secure a better adhesion of the rubber, or the head may be made square for the same purpose. I do not confine myself, however, to these especial modes of fastenings, as numerous other methods can be devised, which the practical working of the invention only can demonstrate as useful.

Hitherto the heads of prop nuts and rivets, being first burnished, have either been plated with metal, which scratches and tarnishes upon exposure, or have been covered with leather, which is put on in two pieces and united by stitches sewed round the edge by hand. This method is objectionable, as the stitches rot and the leather easily dents and mars upon contact; and, if the head is iron, the imperfect fitting of the leather covering allows the escape of rust, which discolors any part of the carriage it may drop upon.

The advantages of my invention are, that nuts and rivets can be made of iron, which does not require a finish before plating and inclosed by a covering which will not tarnish, and without stitching, at a much less cost, and possesses a far greater durability. The covering being of soft rubber will receive or give a blow which will not injure either the object struck or the head itself, which, if of hard rubber, would chip off, or of metal or leather would scratch or dent.

Like letters indicate like parts in the drawings.

Figure 1 is a perspective of the nut.

Fig. 2 is a perspective of the rivet.

Fig. 3 is a longitudinal section of the rivet, showing the head or core A, the rubber B vulcanized over the same, and the shoulder C.

Fig. 4 is a section of the nut, showing the head or core A and the rubber B.

The rubber, while being vulcanized to the core, may be molded in any desired form or design, care being had that the rubber is pressed against the base of the shoulder of the core, forming a tight joint, and leaving enough of the shoulder exposed to form a hold for a wrench in the operation of fastening.

I am aware that a rejected application of Locke, filed September 23, 1869, describes an application of rubber as a protecting agent to the heads of screws, tacks, &c., as a means of protection when driven into articles of ornament and use; but I am not aware that this proposition of Mr. Locke was ever carried into effect practically, and as my invention is not of covering any object intended to be hammered into or screwed by a screw-driver into, or seized by the rubber cover and forced into, any object—but is designed to furnish an article more ornamental than the plated or leather prop nuts and rivets now in use; less liable than they to be scratched or marred; more durable, because so little effected by water or by blows, and applied differently from the things which Locke proposed to apply rubber covers to—it differs from that.

It is important that the rubber should be resilient—it must have the properties of soft vulcanized rubber—not vulcanite, which is brittle—and it is to be molded upon the nut or rivet before or at the time of vulcanizing. This will give an adhesion to the metal.

I claim, and desire to secure by Letters Patent of the United States—

A metallic prop nut or rivet, having its head A enveloped as far as the shoulder C with the resilient rubber cover B molded and vulcanized thereon, substantially as and for the purpose described.

GEO. A. KEENE.

Witnesses:
THOS. WM. CLARKE,
F. F. RAYMOND.